United States Patent Office 3,770,747
Patented Nov. 6, 1973

3,770,747
ALKYLTHIO AND PHENYLTHIO CYCLOPROPYL-AMINES FROM THE REACTION OF CHLOROMETHYL SULFIDES WITH ENAMINES
Ronald H. Rynbrandt, Portage, Mich., assignor to The Upjohn Company, Kalamazoo, Mich.
No Drawing. Filed Nov. 1, 1971, Ser. No. 194,691
Int. Cl. C07d 29/36
U.S. Cl. 260—293.73
10 Claims

ABSTRACT OF THE DISCLOSURE

A compound selected from the group consisting of cis and trans aminocyclopropyl sulfides of the Formula II below:

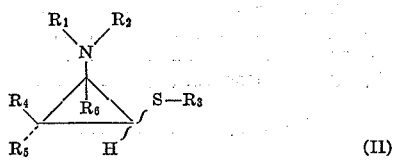

wherein $R_1$ and $R_2$ are selected from the group consisting of alkyl of 1 to 3 carbon atoms, inclusive, cycloalkyl of 5 to 7 carbon atoms, inclusive, or together the group

is a heterocyclic amino radical selected from the group consisting of pyrrolidino, piperidino, methyl-substituted piperidino, morpholino, 4-methylpiperazino, and hexamethyleneimino; wherein $R_3$ is alkyl defined as above, cycloalkyl as defined above, phenyl, or substituted phenyl of the formula

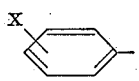

wherein X is selected from the group consisting of alkoxy of 1 to 3 carbon atoms, inclusive, alkyl defined as above, iodine, bromine, chlorine, and fluorine and —$CF_3$; wherein $R_4$ is selected from the group consisting of hydrogen and alkyl as defined above; with the proviso that $R_4$ is always hydrogen when $R_5$ and $R_6$ together form a cycloalkyl ring; wherein $R_5$ is selected from the group of alkyl defined above, or wherein together $R_4$ and $R_5$ form a cycloalkyl ring of 5 to 7 carbon atoms; wherein $R_6$ is hydrogen or wherein together $R_5$ and $R_6$ are alkylene groups of 3 to 5 carbon atoms, inclusive, are prepared by a base catalyzed addition reaction of a selected chloromethyl sulfide to a compound containing an enamine moiety.

The invention also comprises the sulfoxides of II, the quaternary alkyl iodides and bromides (alkyl is 1 to 3 carbon atoms, inclusive,) and the pharmacologically acceptable acid addition salts of II or the sulfoxides of II. These compounds are useful as sedatives and tranquilizers.

BACKGROUND OF THE INVENTION

Field of the invention

This invention is directed to new organic compounds and is particularly concerned with novel cis and trans aminocyclopropyl sulfides II and a process for the production thereof.

The novel compounds and the process of production therefor can be illustratively represented as follows:

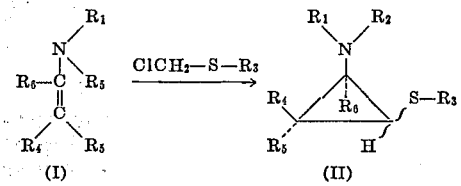

wherein $R_1$ and $R_2$ are selected from the group consisting of alkyl of 1 to 3 carbon atoms, inclusive, cycloalkyl of 5 to 7 carbon atoms inclusive or together the group

is a heterocyclic amino radical selected from the group consisting of pyrrolidino, piperidino, methyl substituted piperidino, morpholino, 4-methylpiperazino, and hexamethyleneimino; wherein $R_3$ is alkyl defined as above, cycloalkyl as defined above, phenyl, or substituted phenyl of the formula

wherein X is selected from the group consisting of alkoxy of 1 to 3 carbon atoms, inclusive, alkyl defined as above, iodine, bromine, chlorine, and fluorine and —$CF_3$; wherein $R_4$ is selected from the group consisting of hydrogen and alkyl as defined above; with the proviso that $R_4$ is always hydrogen when $R_5$ and $R_6$ together form a cycloalkyl ring; wherein $R_5$ is selected from the group of alkyl defined as above, or when together $R_4$ and $R_5$ form a cycloalkyl ring of 5 to 7 carbon atoms; wherein $R_6$ is hydrogen or wherein together $R_5$ and $R_6$ are an alkylene group of 3 to 5 carbon atoms, inclusive.

The invention further comprises the sulfoxides of compounds of Formula II, the quaternary ammonium alkyl bromide and iodides in which alkyl is defined as above, and the pharmaceutically acceptable acid addition salts of the compounds of Formula II and their sulfoxides.

The wavy line indicates that the sulfide group can be either axial or equatorial to the cyclopropane ring and therefore cis or trans to the amino group. Separation was possible. The structure of these compounds may be better understood by Formulas IIa and IIb.

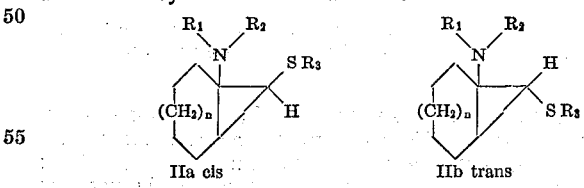

wherein $R_1$, $R_2$, and $R_3$ is defined as above and $n$ is a whole number between 1 to 3, inclusive.

The process of the invention comprises reacting a selected chloromethyl sulfide in the presence of a strong base with an enamine compound of the Formula I at temperatures between —50 to 100° C.

DESCRIPTION OF THE PREFERRED EMBODIMENT

Lower alkyl groups of 1 to 3 carbon atoms, inclusive, are exemplified by methyl, ethyl, propyl, and isopropyl. Alkoxy of 1 to 3 carbon atoms comprises: methoxy, ethoxy, propoxy, and isopropoxy.

The alkylene group of 3 to 5 carbon atoms includes —$(CH_2)_3$; —$(CH_2)_4$; and —$(CH_2)_5$.

The cycloalkyl groups of 5 to 7 carbon atoms are cyclopentyl, cyclohexyl, and cycloheptyl.

The novel compounds of the Formula II, sulfoxides thereof, and the pharmacologically acceptable acid addition salts of II and the quaternary ammonium alkyl iodides or bromides of II have sedative, hypnotic, anticonvulsant, tranquilizing, and muscle relaxant effects in mammals and birds.

The pharmacologically acceptable acid addition salts of compounds of Formula II and its sulfoxides contemplated in this invention, are the hydrochlorides, hydrobromides, hydriodides, sulfates, phosphates, cyclohexanesulfamate, methanesulfonates, acetates, toluenesulfonates, lactates, tartrates, citrates, malates, maleates, and the like, prepared by reacting a compound of Formula II or its sulfoxide with the selected pharmacologically acceptable acid.

Sedative effects of cis-3-[(p-chlorophenyl)thio]-N,N-dimethyl-2-phenylcyclopropylamine as hydrochloride are shown by the following tests in mice:

Chimney test: [Med. Exp. 4, 145 (1961)]: The effective intraperitoneal dosage for 50% of mice ($ED_{50}$) is 71 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 63 mg./kg.;

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 79 mg./kg.

Nicotine antagonism test: Mice in a group of 6 are injected with the test compound cis-2-[(p-chlorophenyl)thio]N,N-dimethyl-trans - 3 - phenylcyclopropylamine hydrochloride. Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 45 mg./kg. of the test compound protected 50% of the mice against (2) and (3) ($ED_{50}$).

Other compounds of Formula II have the following results:

| Compound | $ED_{50}$ (mg./kg./mouse) | | | |
|---|---|---|---|---|
| | Ch | D | P | Ni |
| Trans-2-[(p-chlorophenyl)thio]-N,N-dimethyl-trans-3-phenylcyclopropylamine hydrochloride | 25 | 18 | 32 | 13 |
| Cis-3-[(p-chlorophenyl)sulfinyl]-N,N,2,2-tetramethylcyclopropylamine | 79 | 12.5 | 56 | 40 |
| Cis- and trans-1-[7-[p-chlorophenylthio]-6-norcaryl]piperidine hydrochloride | | 28 | | 57 |
| Cis-N,N-dimethyl-N-[[(2,2-dimethyl-3-methyl)thio]cyclopropylamine | 50 | 50 | 25 | 25 |
| Cis-N,N,N-trimethyl-N-[[2,2-dimethyl-3-(p-chlorophenyl)thio]cyclopropyl]ammonium iodide | 28 | 28 | | 36 |

Note.—Ch=chimney test; D=dish test; P=pedestal test; Ni=nicotine (lethal) test.

The pharmaceutical forms contemplated by this invention include pharmaceutical compositions suited for oral, parenteral, and rectal use, e.g., tablets, powder packets, cachets, dragees, capsules, solutions, suspensions, sterile-injectable forms, suppositories, bougies, and the like. Suitable diluents or carriers such as carbohydrates (lactose), proteins, lipids, calcium phosphate, cornstarch, stearic acid, methylcellulose and the like may be used as carriers in or for coating purposes. Water or oil, e.g., coconut oil, sesame oil, safflower oil, cottonseed oil, peanut oil, may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

As tranquilizer the compounds of Formula II its pharmacologically acid addition salts and sulfoxides thereof can be used in dosages of 1–50 mg./kg. in oral or injectable preparations as described above, to alleviate tension and anxiety in mammals, or birds, such as e.g., occurs when animals are in travel.

Other acid addition salts of the compounds of Formula II can be made such as the fluosilicic acid addition salts which are useful mothproofing compounds or the trichloroacetates useful as herbicides against Johnson grass, Bermuda grass, yellow foxtail and green foxtail, and quack grass.

The starting materials of Formula I of this invention, substituted enamines are known compounds.

In carrying out the process of this invention, a substituted enamine I is reacted with a selected chloromethyl sulfide in the presence of a strong base. In the preferred embodiment of this invention the chloromethyl sulfide is first reacted with the base and with the enamine I at low temperature, e.g. at 50° to 35° C., during several hours, in an organic solvent e.g. ether, tetrahdyrofuran, dioxane or the like. The enamine is preferably used in excess compared to the chloromethyl sulfide such as 1.5 to 5 times the stoichiometrically required amount. As base, alkali alkoxides e.g. sodium or potassium tert.-butoxide, isopropoxide, ethoxide, or alkali hydrides e.g. sodium or potassium hydride can be used. The molar ratios between the base and chloromethyl p-chlorophenylsulfide is preferably 1 to 15 per one mole of the choromethyl sulfide. For the completion of the reaction higher temperatures between 20 to 60° C. are useful. The product of Formula II is recovered and purified by conventional procedures, such as precipitation with water, filtration, evaporation, extraction chromatography, crystallization and the like.

The following examples are illustrative of the processes and products of the present invention, but are not to be construed as limiting.

Example 1.—cis-N,N-dimethyl-N-[[2,2-dimethyl-3-(p-chlorophenyl)thio]cyclopropyl]amine

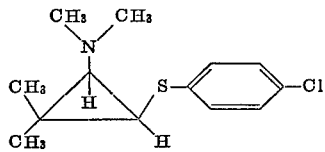

Chloromethyl p-chlorophenyl sulfide (50.0 g.; 0.259 moles) in anhydrous ether (650 ml.) was added dropwise (90 min.) to a well-stirred slurry of potassium t-butoxide (34.8 g.; 0.331 mole) and N,N,2-trimethylpropenylamine (77.0 g., 0.777 mole), in anhydrous ether (350 ml.), under a nitrogen atmosphere. The temperature was maintained at 25±2° by means of a cold-water bath. After stirring an additional 2½ hours at room temperature the reaction mixture was diluted with water (400 ml.) and the layers were separated. The aqueous layer was extracted with ether (400 ml.). The ether layers were combined and washed with water (800 ml.) and saturated brine (500 ml.). The ether solution was then extracted with 1.0 N hydrochloric acid (3× 500 ml.) and the combined aqueous layer washed with ether (2× 800 ml.). The aqueous acid solution was combined with crushed ice (1000 g.) and made strongly alkaline by the addition of 6.0 N sodium hydroxide (300 ml.). The resultant white suspension was extracted with ether (3× 500 ml.) and the combined extracts dried over anhydrous sodium sulfate. In vacuo concentration at 43° gave 40.8 g. of red-brown oil which partially crystallized on standing at 25° C. for 30 minutes. Removal of the non-crystallizable oil (7.0 g.) (33% yield) of cis-N,N-dimethyl-N[[1,1-dimethyl - 2 - (p-chlorophenyl)thio]cyclopropyl]amine as an off-white, crystalline solid of melting point 59–61° C. Thin layer chromatography showed this to be almost pure cis-isomer.

Analysis.—Calcd. for $C_{13}H_{18}ClN_2$ (percent): C, 61.04; H, 7.09; N, 5.48; Cl, 13.86; S, 12.54. Found (percent): C, 60.70; H, 6.99; N, 5.19; Cl, 13.77; S, 12.33.

Example 2.—Trans-N,N-dimetyl-N[[2,2-dimethyl-3-(p-chlorophenyl)thio]cyclopropyl]amine The crude red-brown oil (14.6 g.) from subsequent performances of the above reaction was subjected to absorption chromatography on silica gel (1200 g.) and the column was eluted with 10% ethyl acetate in benzene. Forty-three fractions (100 ml.) were collected. Fractions 17–24 gave 9.0 g. of a yellow oil which slowly crystallized on standing. Based on its NMR spectrum (J=7.0 Hz.) it was assigned the cis configuration and proved to be identical with cis-N,N-dimethyl-N[[1,1-dimethyl-2-(p-chlorophenyl)thio]cyclopropyl]amine. From fractions 32–43 there was obtained 2.7 g. of non-crystallizable yellow oil, to which was assigned the trans configuration on the basis of NMR (J=3.5 Hz.).

Example 3.—Cis- and trans-N,N-dimethyl-N-[(2,2-dimethyl-3-methylthio)cyclopropyl]amine The procedure used was essentially that described in Example 1. The materials used were: chloromethyl methylsulfide (4.83 g.; 0.050 mole) dissolved in anhydrous ether (100 ml.) and a slurry of potassium t-butoxide (6.72 g.; 0.060 mole) and N,N,2-triethylpropenylamine (14.85 g.; 0.150 mole) in anhydrous ether (60 ml.). In vacuo concentration at 40° of the final ether extracts gave 1.9 g. of yellow brown oil. This was subjected to absorption chromatography on silica gel (30 g.) and the column eluted with 10% ethyl acetate in benzene (300 ml.). Fractions 5–7 gave 0.63 g. (7.9% yield) of an oil shown by NMR spectroscopy (J=7.5 Hz.) to be cis-isomer of the indicated product. From fraction 14 there was obtained 0.20 g. (2.5 percent yield) of a yellow oil, shown by NMR spectroscopy (J=3.5 Hz.) to be the trans-isomer. The mass spectra were satisfactory for the structure assigned.

Analysis.—Calcd. for $C_8H_{17}NS$ (percent): C, 60.62; H, 10.76; N, 8.79; S, 20.13. (Cis) found (percent): C, 60.15; H, 10.81; N, 9.07; S, 19.98. (Trans) found (percent): C, 60.13; H, 10.60; N, 8.61; S, 19.93.

Example 4.—1-[2-(p-chlorophenylthio)-3-phenylcyclopropyl]piperidine

Chloromethyl p-chlorophenyl sulfide (7.93 g.; 0.41 mole); dissolved in anhydrous ether (40 ml.), was added dropwise to a vigorously stirred slurry of potassium t-butoxide (7.00 g.; 0.063 mole) and β-piperidinostyrene (28.0 g.; 0.15 mole), in ether (100 ml.), at room temperature. The reaction mixture was stirred for two hours and then allowed to stand for two hours after which it was diluted with water (300 ml.) and extracted with ether (2× 300 ml.). The combined ether extracts were washed with water (300 ml.) followed by washing with saturated brine (150 ml.). The ether solution was shaken with 1.0 N hydrochloric acid (300 ml.) causing immediate oiling out of the product as its hydrochloride. The oil rapidly solidified and was removed from the aqueous layer by vacuum filtration. The ether layer was once again treated with acid and worked up as before. The solids were combined, dissolved in chloroform (300 ml.) and dried over anhydrous sodium sulfate. This solution was then concentrated to 100 ml. and ether was added causing rapid precipitation of a crystalline solid. Upon vacuum filtration and air drying 5.10 g. (32% yield) of 1-[2-(p - chlorophenylthio)-3-phenylcyclopropyl]piperidine as a light tan powdery solid, of melting point 154–156° (d.) C. was obtained. Recrystallization from chloroform/ether (and treatment with activated charcoal Darco G-60) gave pure 1-[2-(p-chlorophenylthio)-3-phenylcyclopropyl]piperidine as a nearly white crystalline solid of melting point 155.5–156° C.

Analysis.—Calcd. for $C_{20}H_{22}ClNS \cdot HCl$ (percent): C, 63.15; H, 6.09; N, 3.68; Cl, 18.64; S 8.43. Found (percent): C, 63.08; H, 6.20; N, 3.92; Cl, 18.85; S, 8.11.

Treatment of 1-[2-(p-chlorophenylthio)-3-phenylcyclopropyl]piperidine hydrochloride with aqueous sodium hydroxide gave the free base 1-[2-(p-chlorophenylthio)-3-phenylcyclopropyl]piperidine.

Example 5.—Cis- and trans-2-[(p-chlorophenyl)thio]-N,N-dimethyl-trans-3-phenylcyclopropylamine In the manner given in Example 4, p-chlorophenyl chloromethyl sulfide (10.0 g.; 0.052 mole), dissolved in anhydrous ether (60 ml.) a slurry of potassium t-butoxide (7.8 g.; 0.070 mole) and β-(N,N-dimethylamino)styrene (23 g., 0.16 mole) in anhydrous ether (100 ml.) were reacted for 2 hours at 23 to 25° C. The reaction mixture was diluted with water (300 ml.) and extracted with ether (2× 300 ml.). The combined ether extracts were washed with water (500 ml.) followed by saturated brine (300 ml.) and then extracted with 1.0 N hydrochloric acid (2× 200 ml.). The amine hydrochloride rapidly separated as an oil from the aqueous layer. This oil was found to have entrained a considerable amount of free amine. The oil was dissolved in chloroform (200 ml.) and the aqueous layer extracted with chloroform (2× 100 ml.). The combined chloroform solutions were shaken with 1.0 N hydrochloric acid (to convert the residual free amine of the product to its hydrochloride) and the chloroform layer washed with saturated brine and dried over anhydrous sodium sulfate. This was concentrated to 200 ml. and ether was added. On standing two days at 5° a solid was deposited which on vacuum filtration and air drying gave 7.19 g. (40.6% yield) of a mixture of the two isomers, (cis- and trans-2-[(p-chlorophenyl)thio]-N,N-dimethyl-trans - 3 - phenylcyclopropylamine as an off-white, crystalline solid of melting point 142–150° C.

SEPARATION OF THE ISOMERS

The above solid was treated with 1.0 N sodium hydroxide (50 ml.) and extracted with ether (2× 25 ml.). The combined ether extracts were washed with water (25 ml.) followed by saturated brine (25 ml.) and dried in the dark over anhydrous sodium sulfate. Concentration of the reaction mixture (53° C. 35 mm.) gave 5.86 g. of a dark yellow oil which was subjected to absorption chromatography on silica gel (800 g.). The column was eluted (gradient) with benzene/ethyl acetate. One hundred milliliter fractions were collected. Fractions 14 through 22 gave 2.83 g. of a light yellow oil. This was converted to its hydrochloride and recrystallized from chloroform/ether to afford 2.29 g. (12.9% yield) of the cis-isomer as a white, crystalline solid of melting point 141.5–142.5° C. Fractions 50 through 61 gave 1.59 g. of a yellow oil which, when treated as above gave 1.30 g. (7.35% yield) of the trans-isomer as a white, crystalline solid of melting point 160.5–161.5° C.

Analysis.—Calcd. for $C_{17}H_{18}ClNS \cdot HCl$ (percent): C, 60.00; H, 5.63; N, 4.12; Cl, 20.84; S, 9.42. Found for cis-isomer (percent): C, 59.93; H, 5.80; N, 3.86; Cl, 20.94; S, 9.37. Found for trans-isomer (percent): C, 60.10; H, 5.54; N, 4.19; Cl, 21.12; S, 9.42.

Example 6.—Cis and trans1-[1,3-tetramethylene-2-[(p-chlorophenyl)thio]cyclopropyl]piperidine. (Cis and trans 1-[7-(p-chlorophenyl)thio]-6-norcaryl]piperidine hydrochloride)

Chloromethyl p-chlorophenyl sulfide (19.3 g.; 0.10 moles) in anhydrous ether (50 ml.) was added dropwise to a well-stirred slurry of potassium t-butoxide (11.2 g.; 0.10 moles) and 1-piperidinocyclohexene (49.5 g.; 0.30 mole) in anhydrous ether (100 ml.), maintained at −15° to −20° under an atmosphere of nitrogen. Upon completion of the addition, the reaction mixture was stirred for 30 minutes at −5° to −10° and then placed in a refrigerator overnight at −15°. It was then stirred for three hours during which time it was allowed to warm to room temperature. It was then diluted with water (150 ml.), the organic layer removed and the aqueous layer extracted with water (400 ml.) followed in turn by saturated brine (2× 200 ml.) and then extracted with 1.0 N hydrochloric acid (2× 250 ml.). The combined aqueous layer was washed with ether (400 ml.). A crystalline solid was slowly deposited from the aqueous solution while standing overnight at 4°. The precipitate was removed by vacuum filtration and recrystallized from ethanol-ether giving 6.8 g. (21% yield) of cis and trans-1-[1,3-tetramethylene - 2 - [(p-chlorophenyl)thio]cyclopropyl]piperidine of melting point 175–175.5° C. as a white, crystalline solid. TLC showed unequal amounts of both cis- and trans-isomers to be present. One additional recrystallization broadened the melting point to 174–184°. The isomers were not separated in the above material.

*Analysis.*—Calcd. for $C_{18}H_{24}ClNS \cdot HCl$ (percent): C, 60.32; H, 7.03; N, 3.91; Cl, 19.79; S, 8.95. Found (percent): C, 60.55; H, 6.73; N, 3.55; Cl, 19.63; S, 9.09.

WORKUP OF THE FILTRATE

The original aqueous filtrate was chilled by adding crushed ice (200 g.) and rendered strongly alkaline by the addition of 1.0 N sodium hydroxide (500 ml.). The resultant white suspension was extracted with methylene chloride (2× 500 ml.) which was in turn washed with water (600 ml.) and saturated brine (300 ml.) and dried over anhydrous sodium sulfate. Concentration in vacuo at 40° gave a semi-solid residue. This was triturated with ether and the insoluble material (1.54 g.) removed by vacuum filtration. The filtrate was concentrated in vacuo to give 8.9 g. of clear, orange colored oil. This was subjected to absorption chromatography on 850 g. of silica gel. The column was eluted with chloroform (stabilized with ethanol) and 34 fractions (250 ml.) were collected. Fractions 24 and 25 gave 0.8 g. of oil which when treated with hydrogen chloride in methylene chloride gave a solid. This, when recrystallized from ether-ethanol afforded 0.19 g. of light tan crystals of melting point 215.5–216° (d.). This was shown by TLC to be one of the isomers in pure form.

*Analysis.*—Calcd. for $C_{18}H_{24}ClNS \cdot HCl$ (percent): C, 60.32; H, 7.03; N, 3.91; Cl, 19.79; S, 9.09. Found (percent): C, 60.04; H, 7.15; N, 3.89; Cl, 19.6; S, 8.69.

Fractions 5–19 gave 3.9 g. of oil which when similarly treated produced 1.7 g. of the other isomer as a light brown crystalline solid. On further recrystallization using activated charcoal (Darco G-60) afforded the hydrochloride as a pure white amorphous powder of melting point 175.5–176° C.

*Analysis.*—Calcd. for $C_{18}H_{24}ClNS \cdot HCl$ (percent): C, 60.32; H, 7.03; N, 3.91; Cl, 19.79; S, 8.95. Found (percent): C, 59.93; H, 7.00; N, 3.84; Cl, 19.54; S, 8.56.

Example 7.—Cis-N,N,N-trimethyl-N-[[2,2 - dimethyl-3-(p-chlorophenyl)thio]cyclopropyl]ammonium iodide

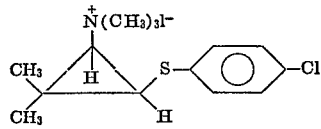

Cis-N,N-dimethyl-N-[[1,1-dimethyl - 2 - (p-chlorophenyl)thio]cyclopropyl]amine (10.0 g.; 0.039 mole) dissolved in 2-butanone (100 ml.) was treated with methyl iodide (40 ml.; 0.64 mole) and heated at reflux under anhydrous conditions for 45 hours. The reaction mixture was cooled and filtered. The warm filtrate, on cooling to room temperature, deposited a crystalline solid. Precipitation was completed by addition of ether. The solid was removed by vacuum filtration to afford 12.8 g. (82.5% yield) of product as an off-white crystalline solid, of melting point 96–98°.

*Analysis.*—Calcd. for $C_{14}H_{21}ClINS$ (percent): C, 42.27; H, 5.32; N, 3.52; S, 8.06; I, 31.91. Found (percent): C, 42.02; H, 5.55; N, 3.50; S, 8.14; I, 31.77.

Example 8.—Cis-3-[(p - chlorophenyl)sulfinyl]-N,N,2,2-tetramethylcyclopropylamine

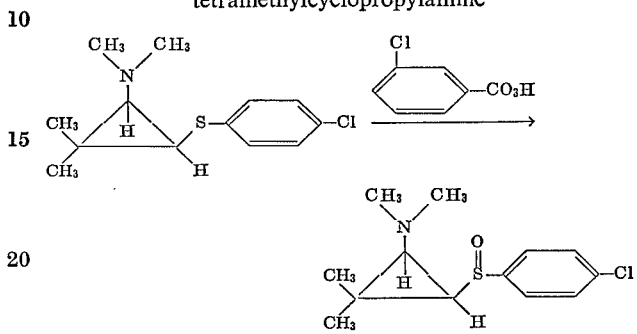

Eighty-five percent m-chloroperoxybenzoic acid (12.1 g.; 59.4 mmoles), dissolved in methylene chloride (250 ml.), was added with vigorous stirring to 3-[(p-chlorophenyl)thio]-N,N,2,2-tetramethylcyclopropylamine (15.2 g.; 59.4 mmoles), dissolved in methylene chloride (500 ml.), maintained at −65° C. and then poured at once (without allowing the reaction mixture to warm) into a solution of saturated sodium carbonate (400 ml.), water (200 ml.) and sodium bisulfite (6.0 g.). After vigorous shaking, the layers were separated and the organic layer was dried over anhydrous sodium sulfate. Concentration gave a viscous yellow oil which rapidly solidified. This was dissolved in a minimum amount of anhydrous ether and chilled at −10°. Crystallization took place slowly (two days) giving 11.15 g. (69% yield) of cis-3-[(p-chlorophenyl)sulfinyl]-N,N,2,2 - tetramethylcyclopropylamine as pure-white needles of melting point 119–121° C.

*Analysis.*—Calcd. for $C_{13}H_{18}ClNOS$ (percent): C, 57.44; H, 6.67; N, 5.15; Cl, 13.04; S, 11.80. Found (percent): C, 57.35; H, 6.91; N, 5.12; Cl, 13.22; S, 11.88.

Example 9.—Cis-3-[(p-chlorophenyl)thio]-N,N,2,2-tetraethylcyclopropylamine

In the manner given in Example 1, chloromethyl, p-chlorophenylsulfide, potassium tert.-butoxide and N,N,2-triethyl-1-butyleneamine in anhydrous ether was reacted together to give cis-3-[(p-chlorophenyl)thio]-N,N,2,2-tetraethylcyclopropylamine.

Example 10.—Cis and trans-N,N-dipropyl-(2,2-diethyl-3-methylthio)cyclopropylamine In the manner given in Example 3, 2-chloromethylethylsulfide, sodium butoxide, and [1-(N,N-dipropylamine)]-2-ethyl-1-butene in anhydrous ether was reacted together to give cis- and trans-N,N-dipropyl-[2,2-diethyl-3-methylthio)-cyclopropyl]amine.

Example 11.—1-[2-(m-ethoxyphenylthio)-3-(o-bromophenyl)cyclopropyl]pyrrolidine

In the manner given in Example 4, chloromethyl m-ethoxyphenyl sulfide, potassium t-butoxide and β-pyrrolidine-o-bromostyrene in tetrahydrofuran was reacted together to give 1-[2-(m-ethoxyphenylthio)-3-(o-bromophenyl)cyclopropylpyrrolidine.

Example 12.—Cis- and trans-N,N-diethyl-3-[(m-fluorophenyl)thio]-2-(p-iodophenyl)cyclopropylamine In the manner given in Example 5, chloromethyl m-fluorophenyl sulfide potassium ethoxide and β-(N,N-diethylamino-p-iodostyrene in tetrahydrofuran was reacted together to give cis- and trans- N,N-diethyl-3-[(m-fluorophenyl)thio]-2-(p-iodophenyl)cyclopropylamine.

Example 13.—Cis and trans-3-[(p-trifluoromethylphenyl)thio]-N,N-diethyl-2-phenylcyclopropylamine In the manner given in Example 5, p-trifluoromethylphenyl chloromethyl sulfide, sodium isopropoxide and β-(N,N-diethylamino)styrene in dibutyl ether was reacted together to give cis- and trans-3-[(p-trifluoromethylphenyl)thio]N,N-diethyl-2-phenylcyclopropylamine.

Example 14.—Cis and trans-1-[1,3-trimethylene-2-[(p-fluorophenyl)thio]cyclopropyl]hexamethyleneimine In the manner given in Example 6, chloromethyl p-fluorophenyl sulfide, potassium tert.-butoxide and 1-hexamethyleneiminocyclopentene in ether was reacted together to give cis and trans[1,3-trimethylene-2-[(p-fluorophenyl)thio]cyclopropyl]hexamethyleneimine.

Example 15.—Cis and trans-1-[1,3-pentamethylene-2-[(o-propoxyphenyl)thio]cyclopropyl]4-propylpiperidine.

In the manner given in Example 6, chloromethyl o-propoxyphenyl sulfide, potassium methoxide and 1-(4-propylpiperidino)cycloheptene in benzene was reacted together to give cis- and trans-1-[1,3-pentamethylene-2-[(o-propoxyphenyl)thio]cyclopropyl](4-propylpiperidine).

Example 16.—Cis-N,N-dimethyl-N-ethyl-N-[2,2-dimethyl-3-(methylthio)cyclopropyl]ammonium bromide In the manner given in Example 7, cis-N,N-dimethyl-N-[(2,2 - dimethyl-3-methylthio)cyclopropyl]amine and ethyl bromide in acetone was reacted together to give cis-N,N-dimethyl - N - ethyl-N-[2,2-dimethyl-(3-methylthio)cyclopropyl]ammonium bromide.

Example 17.—1-[2-(p-chlorophenylthio]-3-phenylcyclopropyl]N-propylpiperidinium iodide In the manner given in Example 7 1-[2-(p-chlorophenylthio)-3-phenylcyclopropyl]piperidine and propyl iodide in 2-butanone was reacted together to give 1-[2-(p-chlorophenylthio-3-phenylcyclopropyl]N - propylpiperidinium iodide.

Example 18.—Cis-1-[2-(o-chlorophenylsulfinyl)-3-phenylcyclopropyl]piperidine

In the manner given in Example 8, m-chloroperoxbenzoic acid in methylene chloride and cis 1-[2-(p-chlorophenylthio)-3-phenylcyclopropyl]piperidine was reacted together to give cis-1-[2-(o-chlorophenylsulfinyl)-3-phenylcyclopropyl]piperidine.

In the manner illustrated by Examples 1 through 6 other amino cyclopropyl sulfides of Formula II can be synthesized by reacting a chloromethyl sulfide and a compound containing an aminoethylene moiety in the presence of a base. Representative compounds II, thus obtained include:

cis and trans-3-[(p-trifluoromethylphenyl)thio]-N,N,2,2-tetrapropylcyclopropylamine;
cis- and trans-3-[(m-iodophenyl)thio]-N,N-dimethyl-2,2-isopropylcyclopropylamine;
cis- and trans-3-[(o-chlorophenyl)thio]-N,N-diethyl-2,2-dimethylcyclopropylamine;
cis- and trans-3-[(p-bromophenyl)thio]-N,N-dipropyl-2-phenylcyclopropylamine;
cis- and trans-3-[cyclopentylthio]-N,N-diisopropyl-2-(o-bromophenyl)cyclopropylamine;
cis- and trans-3-[cyclohexylthio]-N,N-dimethyl-2-(m-fluorophenyl)cyclopropylamine;
cis- and trans-3-[cycloheptylthio]-N,N-dicyclopentyl-2-(p-trifluoromethylphenyl)cyclopropylamine;
cis- and trans-3-[phenylthio]-N,N-dicyclohexyl-2-(m-iodophenyl)cyclopropylamine;
cis- and trans-3-[(o-chlorophenyl)thio]-N,N-diethyl-2,2-pentamethylenecyclopropylamine;
cis- and trans-3-[(o-fluorophenyl)thio]-N,N-dicycloheptyl-2-(o-methoxyphenyl)cyclopropylamine;
cis- and trans-3-[cyclopentylthio]-N,N-dicyclohexyl-2-(p-propoxyphenyl)cyclopropylamine;
cis- and trans-3-[p-isopropoxyphenylthio)-N,N-diethyl-2-[m-ethoxyphenyl]cyclopropylamine;
cis- and trans-1-[1,3-tetramethylene-2-[(p-bromophenyl)thio]cyclopropylpiperidine;
cis- and trans-1-[1,3-pentamethylene-2-[cyclopentylthio]-cyclopropylmorpholine;
cis- and trans-1-[1,3-trimethylene-2-[cyclohexylthio]cyclopropylmorphiline;
cis- and trans-1-[1,3-tetramethylene-2-[cycloheptylthio]cyclopropyl-3-ethylpiperidine;
cis- and trans-1-[1,3-pentamethylene-2-[(o-trifluoromethylphenyl]thiocyclopropylmorpholine;
cis- and trans-1-[1,2-trimethylene-3-[M-methoxyphenyl]thio-(4-methylpiperazino);
cis- and trans-1-[1,2-tetramethylene-3-[m-ethoxyphenyl]thiocyclopropyl-3-ethylpiperidine;
cis- and trans-1-[1,2-pentamethylene-3-(p-propoxyphenyl)thiocyclopropyl N,N-hexamethyleneamine;
cis- and trans-N,N,2,2-tetramethyl-3-methylthiocyclopropylamine;
cis- and trans-N,N,2,2-tetrapropyl-3-ethylthiocyclopropylamine;
1-[2-(o-bromophenylthio)-3-phenylcyclopropyl]hexamethyleneimine;
1-[2-(cyclopentylthio)-3-(o-fluorophenylcyclopropyl)](2-methylpiperidine);

and the like.

In the manner illustrated in Example 8 the above thio compounds of Formula II are converted to the coerresponding sulfinyl compounds by reacting such compounds with organic peroxy acids, e.g. m-chloroperoxybenzoic acid, p-methylperoxybenzoic acid, peroxybenzoic acid, peroxyacetic acid, performic acid, and the like.

Treating the compounds of Formula II or sulfoxides of Formula II compounds with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids produces the pharmacologically acceptable salts of these compounds of Formula II and for Formula II sulfoxides which can be used like the free base compound of Formula II. Salt formation is achieved in conventional manner by reacting the compounds of Formula II or sulfoxides thereof with excess of a selected acid in a suitable medium e.g. water, a lower alkanol, ether, or acetone and recovering the salt by evaporating the solvent, preferably in vacuo.

Treating, like in Example 7, the compounds of Formula II above with methyl, ethyl, propyl, isopropyl, bromide, or iodides is productive of the quaternary alkyl halides of the compounds of Formula II above.

I claim:
1. Cis-[N,N-dimethyl - N - (2,2 - dimethyl-3-methylthio)cyclopropyl]amine.
2. Cis-1-[2-(p-chlorophenylthio)-3-trans - 3 - phenylcyclopropyl]piperidine.
3. Trans-1-[2-(p-chlorophenylthio)-3-trans - 3 - phenylcyclopropyl]piperidine.
4. Cis-2-[(p-chlorophenyl)thio] - N,N - dimethyl - 3-trans-3-phenylcyclopropylamine.
5. Trans-2-[(p-chlorophenyl)thio] - N,N - dimethyl-3-trans-3-phenylcyclopropylamine.
6. A process for the production of cis and trans aminocyclopropyl sulfides of the Formula II:

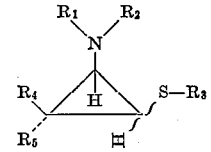

wherein $R_1$ and $R_2$ are selected from the group consisting of alkyl of 1 to 3 carbon atoms, inclusive, cycloalkyl of 5 to 7 carbon atoms, inclusive or the group

is a heterocyclic amino radical selected from the group consisting of pyrrolidino, piperidino, methyl-substituted piperidino, morpholino, 4-methyl-piperazino and hexamethyleneimino; wherein $R_3$ is alkyl defined as above, cycloalkyl as defined above, phenyl or substituted phenyl

wherein X is selected from the group consisting of iodine, bromine, chlorine, and fluorine; wherein $R_4$ is selected from the group consisting of hydrogen and alkyl as defined above, and wherein $R_5$ is alkyl defined as above, or phenyl, which comprises treating a chloromethyl sulfide of the formula:

$$ClCH_2SR_3$$

wherein $R_3$ is defined as above, with an aminoethylene compound of the Formula I:

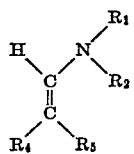

(I)

in which $R_1$, $R_2$, $R_4$ and $R_5$ are defined as above, in the presence of a strong base, at $-50°$ to $35°$ C. and heating thereafter the reaction mixture to a temperature of 20 to 60° C. to obtain the compound of Formula II above.

7. The process of claim 6, wherein the base is a sodium or potassium alkoxide.

8. The process of claim 7 wherein chloromethyl p-chlorophenylsulfide is reacted with N,N,2-trimethylpropenylamine.

9. The process of claim 7 wherein chloromethyl p-chlorophenyl sulfide is reacted with β-piperidinostyrene.

10. The process of claim 7 wherein chloromethyl p-chlorophenyl sulfide is reacted with β-(N,N-dimethylaminostyrene).

References Cited
UNITED STATES PATENTS

| | | | |
|---|---|---|---|
| 3,156,725 | 11/1964 | Kaiser et al. | 260—470 |
| 3,527,756 | 9/1970 | Szmuszkovicz | 260—293.65 |

HENRY R. JILES, Primary Examiner

S. D. WINTERS, Assistant Examiner

U.S. Cl. X.R.

260—563 R, 577, 326.84, 293.65, 247.1, 268 R, 239 B, 567.6 M, 609 E, 609 R, 583 H; 424—244, 248, 250, 267, 274, 325, 330

UNITED STATES PATENT OFFICE
CERTIFICATE OF CORRECTION

PATENT NO. : 3,770,747
DATED : November 6, 1973
INVENTOR(S) : Ronald H. Rynbrandt It is certified that error appears in the above-identified patent and that said Letters Patent are hereby corrected as shown below:

Column 2, line 3-10, Formula I should appear as shown below instead of as in the patent:

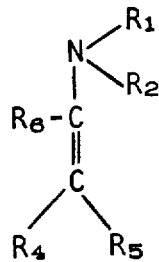

I

Column 4, line 26, "at 50°" should read -- at -50° --. Column 5, line 39, "be cis-" should read -- be the cis- --. Column 10, line 9, "propylmorpholine" should read -- propylpyrolidine --; line 34/35, "corersponding" should read -- corresponding --. Column 10, line 70-75, Formula II should appear as shown below instead of as in the patent:

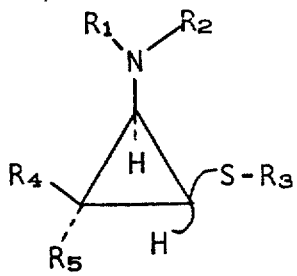

Signed and Sealed this seventh Day of October 1975

[SEAL]

Attest:

RUTH C. MASON
Attesting Officer

C. MARSHALL DANN
Commissioner of Patents and Trademarks